(12) United States Patent
Rydsmo et al.

(10) Patent No.: US 12,090,950 B2
(45) Date of Patent: Sep. 17, 2024

(54) PEDESTRIAN PROTECTION DEVICE

(71) Applicant: Autoliv Development AB, Vargarda (SE)

(72) Inventors: Erik Rydsmo, Ljung (SE); Mikael Andersson, Alingsas (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 18/245,836

(22) PCT Filed: Sep. 6, 2021

(86) PCT No.: PCT/EP2021/074434
§ 371 (c)(1),
(2) Date: Mar. 17, 2023

(87) PCT Pub. No.: WO2022/063548
PCT Pub. Date: Mar. 31, 2022

(65) Prior Publication Data
US 2024/0025371 A1   Jan. 25, 2024

(30) Foreign Application Priority Data
Sep. 23, 2020 (DE) ............. 10 2020 124 824.5

(51) Int. Cl.
*B60R 21/34* (2011.01)
*F16F 7/12* (2006.01)

(52) U.S. Cl.
CPC .......... *B60R 21/34* (2013.01); *F16F 7/123* (2013.01); *B60R 2021/343* (2013.01); *B60R 2021/346* (2013.01)

(58) Field of Classification Search
CPC ... B60R 21/34; B60R 21/00; B60R 2021/343; B60R 2021/346; B60R 2021/0273;
(Continued)

(56) References Cited

U.S. PATENT DOCUMENTS

| 6,415,883 B1 | 7/2002 | Myrholt et al. |
| 7,350,851 B2 * | 4/2008 | Barvosa-Carter ............ B60N 2/42709 296/187.02 |
| 7,866,695 B2 * | 1/2011 | Baumann .................. F16F 3/02 280/743.2 |

FOREIGN PATENT DOCUMENTS

DE   102016224802 A1   6/2018
JP     2006282105 A  * 10/2006

* cited by examiner

*Primary Examiner* — Keith J Frisby
(74) *Attorney, Agent, or Firm* — DICKINSON WRIGHT PLLC

(57) ABSTRACT

A pedestrian protection device for a motor vehicle having a windscreen and an A-pillar extending adjacent a side edge of the windscreen. The protection device comprises a base member securable to the A-pillar of the motor vehicle, and a trim member moveable relative to the base member. A deployment mechanism is operable upon actuation of the device to drive the trim member away from the base member from an initial position in which the trim member is proximal to the base member, to a deployed position in which the trim member is spaced from the base member. The deployment mechanism comprises a plastically deformable member interconnecting the base member and the trim member and which is arranged, in said deployed position of the trim member, to absorb impact energy arising from impact between a pedestrian and the trim member in compression.

19 Claims, 16 Drawing Sheets

(58) Field of Classification Search
CPC ......... B60R 13/04; B60R 19/38; B60R 19/40; B62D 25/04; F15B 15/19; F16F 7/12; F16F 7/123
USPC ............ 180/271; 280/751, 753; 296/187.03, 296/187.04
See application file for complete search history.

PEDESTRIAN PROTECTION DEVICE

CROSS-REFERENCE TO RELATED APPLICATIONS

This application is a 35 U.S.C. § 371 national phase of PCT International Application No. PCT/EP2021/074434, filed Sep. 6, 2021, which claims the benefit of priority under 35 U.S.C. § 119 to German Patent Application No. 10 2020 124 824.5, filed Sep. 23, 2020, the contents of which are incorporated herein by reference in its entirety.

FIELD

The present invention relates to a pedestrian protection device. More particularly, the present invention relates to a pedestrian protection device for a motor vehicle, and to a motor vehicle equipped with such a device.

BACKGROUND

When a motor vehicle is involved in a frontal impact with a pedestrian, it is known to be common for the body of the pedestrian to be thrown over or onto the hood of the vehicle and to strike the windscreen area of the vehicle. Whilst pedestrian impact with the windscreen itself can cause significant injury, the highest risk parts of the windscreen area of a motor vehicle are considered to be the vehicle's A-pillars. The A-pillars form part of the structure of a motor vehicle body, and extend upwardly and rearwardly from the region of the rear corners of the vehicle's hood, along respective side edges of the windscreen. The A-pillars of a vehicle are important structural members because they must be sufficiently strong to support not only the windscreen but also the vehicle's roof during normal driving and also in the event of a rollover accident. These structural requirements of a vehicle's A-pillars make them difficult to engineer such that they absorb sufficient impact energy from a striking pedestrian to prevent serious injury to the pedestrian.

In an attempt to render motor vehicles safer to pedestrians in the event of an impact, it has been proposed previously to provide a motor vehicle with a so-called pedestrian airbag of a type which, if vehicle sensors indicate that a collision with a pedestrian is occurring or is likely to occur, inflates to cover the left and right A-pillars of the vehicle, and optionally also the windscreen therebetween. Typically, an airbag of this general type is provided in an initially folded and/or rolled package and is stored beneath a rear part of the vehicle's hood, for inflation in a generally rearwards direction across the windscreen and A-pillars. The rear of the hood may be lifted by another air-bag, a piston or another arrangement, to allow sufficient space for the pedestrian airbag to inflate so that it deploys in a manner effective to cover the A-pillars of the vehicle, and optionally the windscreen, thereby cushioning the impact of a pedestrian with these parts of the vehicle.

Although pedestrian airbags of the general type described above can provide a good level of protection to pedestrians in the event of impact with either A-pillar of a motor vehicle, they can present a packaging challenge to motor vehicle designers. This is because conventional pedestrian airbags are actually very large in size in comparison to other types of airbags used in motor vehicles, such as driver airbags, which means that the initially folded and/or rolled airbag package is relatively large, and the inflator required to inflate the airbag is also large due to the volume of gas required to achieve adequate inflation. Both of these factors make it difficult to accommodate conventional pedestrian airbag modules in many modern motor vehicles, where space is at a premium for vehicle designers, particularly in the region of the engine bay where such airbags must often be installed.

There have been proposals to provide the A-pillars of a motor vehicle with individual respective airbags, in an effort to provide sufficient pedestrian protection from impact with the A-pillars using relatively small airbags. However, these arrangements can also present significant packaging difficulties, as well as additional challenges in terms of ensuring that the airbags deploy with sufficient coverage over the A-pillars to provide effective protection. Whilst good deployment characteristics might be achievable by housing the airbags inside or adjacent the A-pillars themselves, such that the uninflated airbag packages extend along the A-pillars, this is extremely difficult to achieve in practice due to the relatively slender configuration of the A-pillars, which is necessary to ensure that the driver of the vehicle is not presented with dangerous blind spots in his or her view through the windscreen.

It would therefore be desirable to provide an alternative pedestrian protection apparatus, to provide adequate protection to a pedestrian against impact with a motor vehicle's A-pillars, without requiring an airbag arrangement, and which can be more easily accommodated into the design of a motor vehicle, in an unobtrusive manner.

The present invention has been devised in light of the above considerations.

SUMMARY

According to a first aspect of the present invention, there is provided a pedestrian protection device for a motor vehicle of a type having a windscreen and an A-pillar extending adjacent a side edge of the windscreen, the protection device comprising: a base member securable to the A-pillar of the motor vehicle; a trim member moveable relative to said base member; and a deployment mechanism operable upon actuation of said device to drive said trim member away from said base member from an initial position in which the trim member is proximal to said base member, to a deployed position in which the trim member is spaced from the base member; wherein: said deployment mechanism comprises a plastically deformable member interconnecting said base member and said trim member and which is arranged, in said deployed position of said trim member, to absorb impact energy arising from impact between a pedestrian and said trim member in compression.

Optionally, said base member and said trim member are both elongate, and are arranged so as to be substantially parallel to one another in said initial position; said deployment mechanism being operable to maintain said parallelism during movement of said trim member from said initial position to said deployed position.

Said deployment mechanism may comprise a parallel motion linkage arrangement. The deformable member may form part of said parallel motion linkage arrangement.

Optionally, said deformable member is substantially elongate and formed of ductile material.

In some embodiments it is envisaged that the deformable member may be provided in the form of a metal strut and may, for example, be formed of steel, aluminium or other suitable ductile metals.

The trim member is optionally formed of plastic. The base member may also be formed of plastic material.

Conveniently, said deformable member may be pivotally connected to said base member and pivotally connected to said trim member.

Advantageously, said deployment mechanism is operable to drive said trim member away from said base member via pivotal movement of said deformable member relative to said base member and said trim member.

In some embodiments, the deployment mechanism comprises a plurality of said plastically deformable members.

In such embodiments, each of said deformable members may comprise a pair of non-parallel limbs terminating in cranked ends which are pivotally connected to said base member. Optionally, said plurality of deformable members are arranged in an initial nested relationship relative to one another in an initial un-deployed configuration of the device, such that the limbs of at least one said deformable member are at least partially received between the limbs of an adjacent deformable member. In some embodiments of this type, it is envisaged that said plurality of deformable members may be received within said base member in said initial nested relationship.

Optionally, said deployment mechanism further comprises a lifter member engaged with each said deformable member and which is moveable to urge said deformable members from respective initial positions to respective deployed positions in synchronism.

Conveniently, said deployment mechanism further comprises a pyrotechnical actuator operable to urge said trim member from said initial position towards said deployed position.

It is envisaged that the pyrotechnical actuator may be operable to move said lifter member and thereby urge said deformable members from respective initial positions to respective deployed positions in synchronism.

Optionally, the lifter member is provided in the form of an elongate metal plate, which may be formed from steel, aluminium, or another suitable metal.

The pedestrian protection device of the present invention provides effective protection against injury to pedestrians which may be caused by striking the A-pillar of a motor vehicle. The device may be less expensively produced than equivalent conventional airbag arrangements, and is considerably smaller in overall dimensions, in its undeployed condition, than conventional airbag arrangements, meaning that it can more easily be packaged in a modern motor vehicle. The device is also lower in overall weight than a comparable airbag system. Additionally, the device of the present invention has been found to provide more reliable positioning of its key energy absorbing components relative to the A-pillar when deployed, in comparison to a conventional airbag arrangement.

According to a second aspect of the present invention, there is provided a motor vehicle comprising a windscreen, an A-pillar extending along a side edge of the windscreen, and a pedestrian protection device according to the first aspect of the invention, wherein the base member of said pedestrian protection device is secured to said A-pillar, and wherein the trim member of the pedestrian protection device lies against or adjacent the A-pillar to define at least part of an exterior surface of the A-pillar in its initial position.

According to a third aspect of the present invention, there is provided a motor vehicle comprising a windscreen, a pair of A-pillars extending along respective side edges of the windscreen, and a pair of pedestrian protection devices according to the first aspect of the invention, wherein the base member of each said pedestrian protection device is secured to a respective A-pillar, and wherein the trim member of each pedestrian protection device lies against or adjacent the respective A-pillar to define at least part of an exterior surface of the A-pillar in its initial position.

BRIEF DESCRIPTION OF THE DRAWINGS

So that the invention may be more readily understood, and so that further features thereof may be appreciated, embodiments of the invention will now be described by way of example with reference to the accompanying drawings, in which.

DETAILED DESCRIPTION

Aspects and embodiments of the present invention will now be discussed with reference to the accompanying figures. Further aspects and embodiments will be apparent to those skilled in the art.

Figure 1:
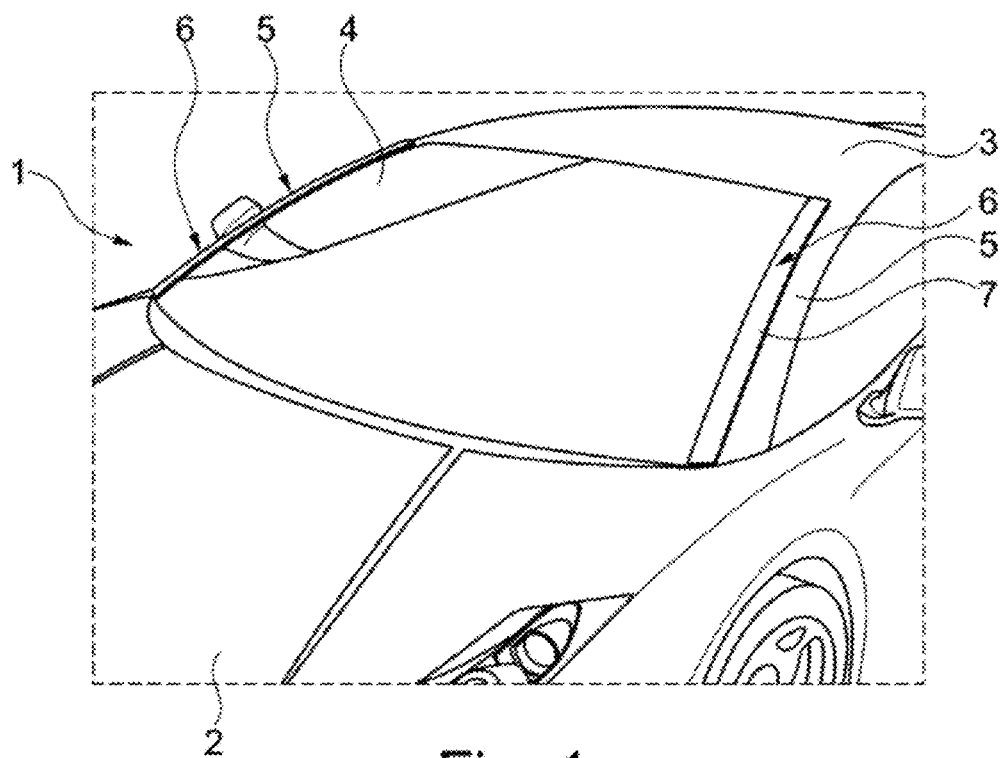
FIG. 1 is a perspective view of the windscreen region of a motor vehicle equipped with a pedestrian protection device in accordance with the present invention, showing the device in its normal configuration prior to deployment.
Figure 2:
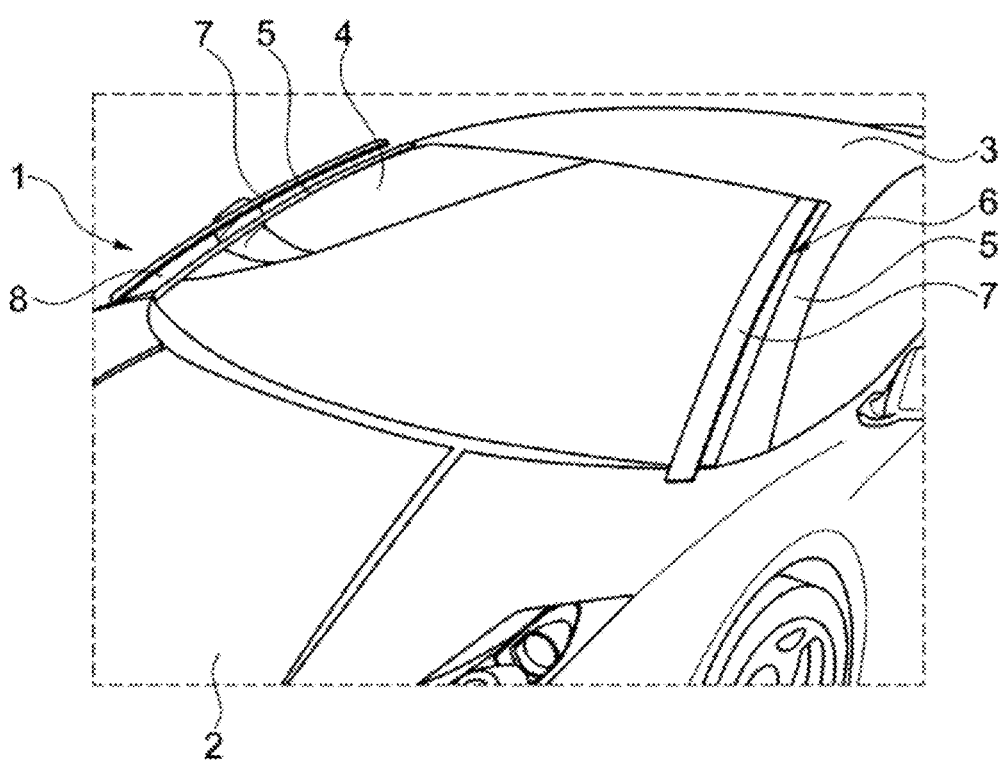
FIG. 2 is a view corresponding generally to that of FIG. 1, but which shows the pedestrian protection device schematically and in a deployed configuration following actuation.

FIGS. 1 and 2 illustrate the windscreen region of a motor vehicle 1 of generally conventional configuration and which comprises a hood 2, a roof 3, and a windscreen 4 mounted between a pair of structural A-pillars 5 on respective sides of the vehicle. The A-pillars 5 extend upwardly and rearwardly from the region of the rear corners of the hood 2, and support the roof 3 and the windscreen 4.

The vehicle 1 illustrated in FIGS. 1 and 2 is equipped with a pair of pedestrian protection devices 6 in accordance with the present invention and of a configuration as described in detail below. Each device 6 is associated with, and secured to, a respective A-pillar 5, and is operable in response to an actuating signal from a sensor configured to detect an impact between the vehicle 1 and a pedestrian, or the likely occurrence of such an impact, so as to deploy from the initial configuration illustrated in FIG. 1 to a deployed configuration as illustrated in FIG. 2.

As shown in FIG. 1, in the initial configuration of each pedestrian protection device 6, an elongate trim member 7 of the device adopts an initial position in which it lies along and against or adjacent the respective A-pillar so as to define part of the exterior surface of the A-pillar. It is envisaged that the shape and configuration of the trim member (including, for example, its surface finish) will be tailored specifically to the vehicle on which the device is installed, so as to create the impression of being an integral and visually consistent part of the A-pillar.

As will be described in more detail below, during deployment of each pedestrian protection device 6 in response to an actuating signal from the sensor, the trim member 7 is driven by a deployment mechanism from the initial position illustrated in FIG. 1 to a deployed position in which it is spaced forwardly from the respective A-pillar 5, as illustrated in FIG. 2. The principle behind the device 6 is that a pedestrian impacted by the vehicle 1 in an accident and launched towards one of the vehicle's A-pillars 5 will make initial contact with the trim member 7 of the protection device 6 in its deployed position, with the resulting space 8 created between the trim member 7 and the rigid structure of the A-pillar 5 permitting the controlled absorption of impact energy, thereby reducing the risk of injury to the pedestrian.

Figure 3:
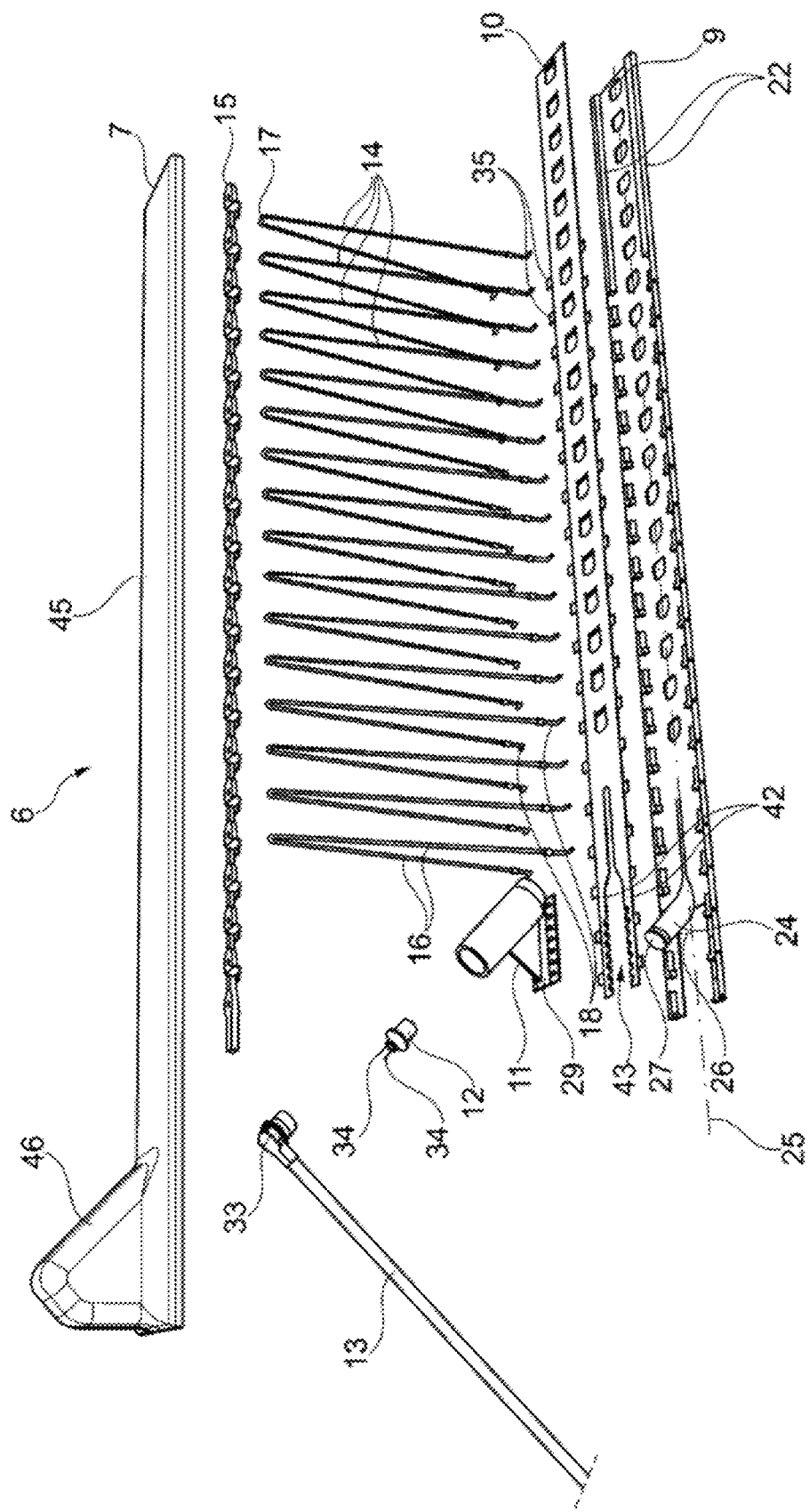
FIG. 3 is an exploded perspective view showing constituent parts of an embodiment of the pedestrian protection device according to the invention.

FIG. 3 is an exploded view showing the main components of an embodiment of the pedestrian safety device 6, including the above-mentioned trim member 7, an elongate base member 9, and components making up a deployment mechanism, namely: a lifter member 10; an actuator housing 11; an igniter 12 and associated control cable 13; a plurality of deformable members 14; and an elongate bracket 15 configured to attach the deformable members 14 to the underside of the trim member 7.

The plurality of deformable members 14 of the deployment mechanism are all substantially identical to one another, with each being formed of a suitably strong plastically deformable material such as a ductile metal. In particular embodiments the deformable members 14 are formed of substantially rigid steel wire, although it is envisaged that in alternative embodiments they could be formed from aluminium wire instead. As illustrated in FIG. 3, each deformable member 14 is generally elongate in form and has an A-shaped configuration comprising a pair of non-parallel limbs 16 which diverge in a downwards direction, such that the deformable members 14 have a generally tapered form and are wider at their lower ends than at their upper ends. The upper ends of the two limbs 16 are interconnected by a short straight section 17 of the rigid wire, whilst the lower ends of the limbs 16 terminate in aligned outwardly cranked ends 18.

As will be described in more detail below and with specific reference to FIGS. 3 and 4, the plurality of deformable members 14 are arranged so as to be equi-spaced from one another in a linear array, and are pivotally connected to both the uppermost trim member 7 and the lowermost base member 9, so as to interconnect the trim member 7 and the base member 9 in the manner of a parallel motion linkage, such that the trim member 7 is moveable relative to the base member 9 whilst being constrained to remain substantially parallel to the base member 9.

Figure 4:
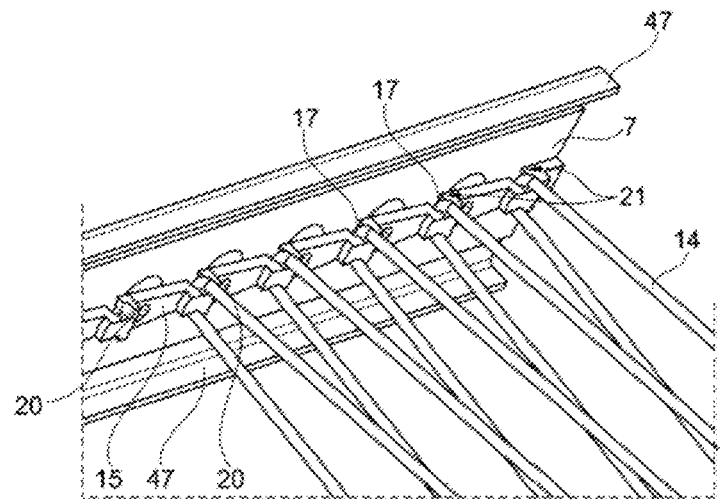
FIG. 4 is a perspective view from below, showing a trim region of the pedestrian protection device illustrated in FIG. 3.

As shown in FIG. 4, the deformable members 14 are pivotally connected to the trim member 7 at their upper ends via the elongate bracket 15. In particular embodiments it is envisaged that the trim member 7 will be formed of plastic, and the bracket 15, which may also be formed of plastic, is secured to the underside of the trim member 7 (for example via fasteners 20 such as screws, or by adhesive, or heat fusion) so as to define a plurality of spaced apart channels 21 therebetween, each of which receives the upper straight section 17 of a respective deformable member 14 as a rotational fit.

The base member 9 is elongate and has a length generally corresponding to the length of the trim member 7. It is proposed that the base member 9 may be formed from plastic such as, for example, the same plastic material from which the trim member 7 is formed, and will be secured to an A-pillar of the motor vehicle 1 so as to extend at least partially along the A-pillar, as will be apparent from FIGS. 1 and 2.

The base member 9 comprises a pair of spaced-apart upstanding flanges 22 along respective side edges, each of which is provided with a series of spaced-apart blind bores 23 along its length. As will be understood from the partially cut-away view of FIG. 5, the blind bores 23 formed in each flange 22 are each aligned across the width of the base member with a corresponding bore 23 in the opposing flange 22, such that each bore 23 may receive therein a respective cranked end 18 of a deformable member 14 as a rotational fit, with the opposing bore in the opposite flange 22 receiving the other cranked end 18 of the same deformable member 14 in an identical manner. In this manner, the lower ends of the deformable members 14 are pivotally connected to the base member 9.

As illustrated most clearly in FIG. 3, the base member 9 is provided with a firing spigot 24 towards its forwardmost end (the left-hand end in the orientation illustrated), which in some embodiments may be moulded as an integral part of the base member 9. The spigot 24 forms part of the device's actuator arrangement, and is provided towards the end of the base member 9 which will be mounted at the bottom of the A-pillar when the device 6 is installed in the motor vehicle, so that it may be accommodated in the so-called 'scuttle' region of the vehicle, at the bottom of the windscreen 4. The spigot 24 is located on the central longitudinal axis 25 of the base member 9, is cylindrical in form, and extends upwardly at an acute angle 26 (optionally 45°) to the longitudinal axis 25 so that an end surface 27 of the spigot is presented towards the proximate forward end of the base member 9.

Figure 6:
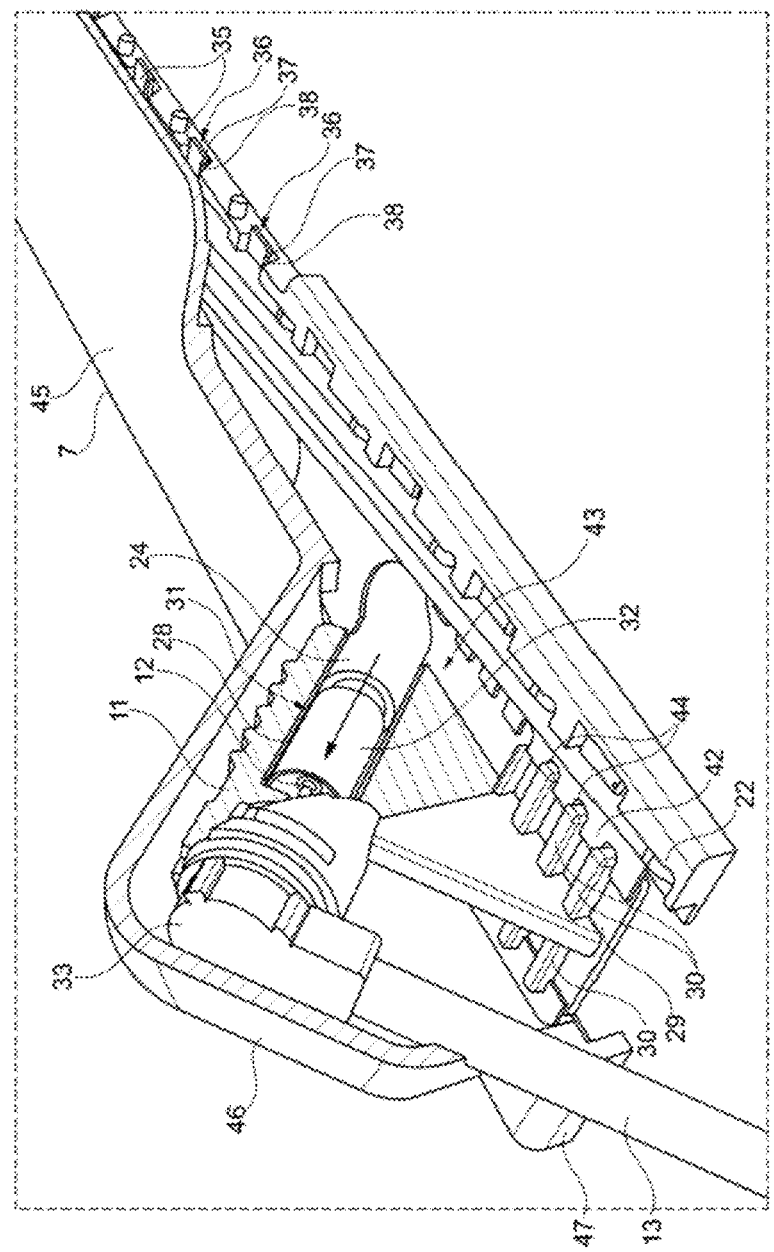
FIG. 6 is a partially cut-away perspective view showing the pedestrian protection device in its normal configuration prior to deployment.

As illustrated most clearly in FIG. 6, the spigot 24 is configured for interaction with the actuator housing 11. More particularly, the spigot 24 is received as a close sliding fit within the lower end of a cylindrical firing chamber 28 defined inside the actuator housing 11. FIG. 6 shows the actuator housing 11 in its initial position prior to deployment of the pedestrian protection device, in which the spigot 24 is substantially fully received within the firing chamber 28, and in which a foot plate 29 of the actuator housing 11 is received within a cut out region at the forward end of the base member 9, between the two side flanges 22. The foot plate 29 of the actuator housing 11 is generally planar in form, but has a plurality of upstanding and spaced-apart projections 30 formed thereon.

As also shown in FIG. 6, a pyrotechnical actuator 31 is housed in the upper end of the firing chamber 28, and which comprises a pyrotechnic charge 32 located immediately adjacent the end surface 27 of the spigot 24. The igniter 12 forms part of the actuator 31 and may, for example, take the form of a squib. The igniter 12 is provided within the uppermost end of the firing chamber 28, immediately adjacent and operatively connected to the pyrotechnic charge 32. The upper end of the firing chamber 28 is then closed by an end cap 33, which may be provided in the form of an electrical connector on the end of the control cable 13, and which thereby serves to electrically connect the control cable to 13 to electrical contacts 34 on the igniter. As will be appreciated by those of skill in the art, the igniter 12 may thus be arranged to receive an actuation signal from an electronic controller, via the control cable 13 and in response to an actuating signal from a sensor configured to detect an impact between the vehicle 1 and a pedestrian, or the likely occurrence of such an impact, in order to deploy the pedestrian protection device 6.

Figure 5:
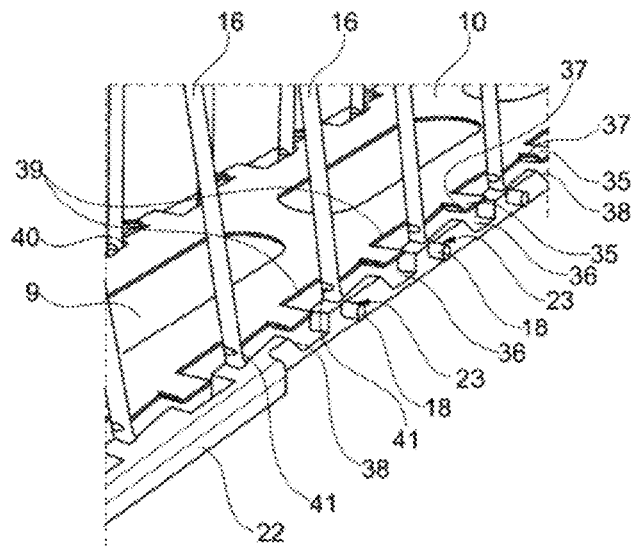
FIG. 5 is a perspective view from above, showing a base region of the pedestrian protection device.

Turning now to consider FIGS. 3, 5 and 6 in particular, the configuration of the lifter member 10 will be considered in more detail. The lifter member 10 is preferably formed from metal such as steel or aluminium, and takes the form of an elongate metal plate. As illustrated in FIG. 3, the lifter member 10 is elongate in form and has a length generally corresponding to the length of the base member 9. However, it is to be appreciated that in preferred embodiments of the invention, the lifter member 10 is actually slightly shorter than the base member 9, so as to permit a small degree of longitudinal movement of the lifter member 10 relative to the base member 9 without extending past the end of the base member 9.

In a general sense, the lifter member 10 is sized in width to fit between the two side flanges 22 of the base member 9 for longitudinal movement therebetween. More particularly, however, the lifter member 10 has a plurality of outwardly directed guide tabs 35 which are equi-spaced along each longitudinal side edge of the plate. As illustrated most clearly in FIG. 3, the guide tabs 35 along each side edge are each aligned across the width of the lifter member 10 with a corresponding guide tab 35 on the opposite side edge.

As illustrated most clearly in FIG. 6, in an initial condition of the pedestrian protection device 6 prior to deployment, the lifter plate 10 sits on the uppermost major surface of the base member 9, with the guide tabs 35 of the lifter member 10 received within respective guide recesses 36 formed at spaced-apart positions along the side flanges 22 of the base member 9. Each guide recess 36 is longitudinally positioned between a pair of pivot bores 23 such that each guide tab 35 of the lifter member 10 is located between the lower ends 18 of an adjacent pair of deformable members 14.

The front edge region of each guide tab 35 is bent upwardly to define a respective upturned lip 37 at the front end of the guide tab 35. In the initial position illustrated in FIG. 6, the upturned front lips 37 of the guide tabs 35 each rest against a correspondingly angled guide surface 38, each guide surface 38 defining an inclined ramp surface at the front end of each respective guide recess 36 formed in the flanges 22 of the base member 9.

Turning now to consider FIG. 5, which shows the lifter member 10 somewhat raised relative to the initial position illustrated in FIG. 6, it will be observed that the lifter member 10 is also provided with a plurality of cut-outs along its sides, each cut-out accommodating the lower part of a respective limb 16 of a deformable member 14. More particularly, the rearward end of each cut-out defines a respective contact edge 40 which is arranged to make contact with and bear against the lower part of a respective said limb 16 of a deformable member 14. In this regard, it is to be noted that in the embodiment illustrated in FIGS. 5 and 6, the lower part of each limb 16 is provided with notches 41 formed in its frontwardly and rearwardly directed sides (although only the frontwardly-directed notches 41 are clearly visible in the figures), with each contact edge 40 of the lifter member 10 engaging a respective rearwardly-directed notch 41 when in the raised position illustrated.

As shown most clearly in FIGS. 3 and 6, the forwardmost end of the lifter member 10 (i.e. the end corresponding to the spigot-end of the base member 9) is bifurcated into a pair of elongate arms 42 defining an opening 43 therebetween. The opening is configured to accommodate the actuator housing 11 and spigot 24, such that each arm 42 extends alongside a respective side of the housing 11 so as to sit over a respective side region of the foot plate 29. The inwardly directed and opposing edges of the arms 42 are provided with a plurality of spaced-apart notches 44 which are sized and configured to engage respective projections 30 on the foot plate 29 of the actuator housing 11.

Figure 7:
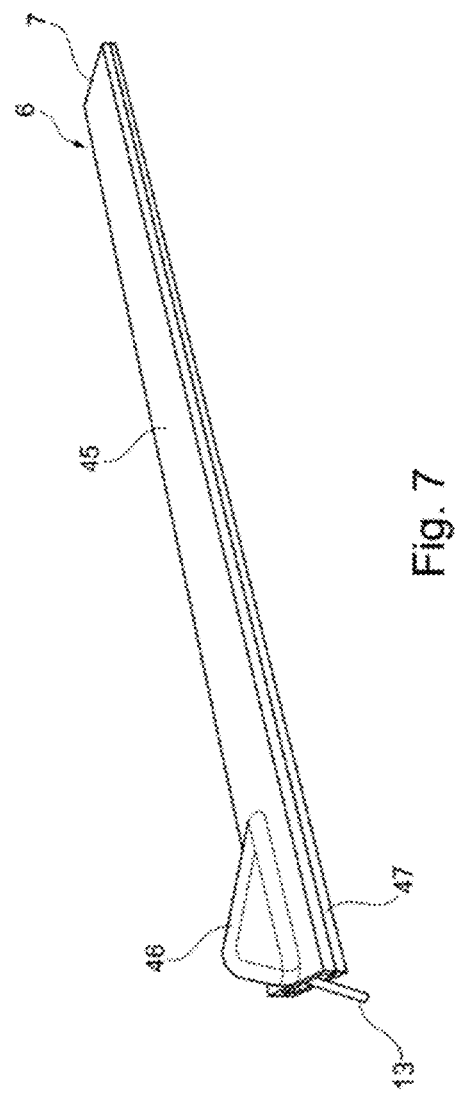
FIG. 7 is a perspective view showing the entire pedestrian protection device in its normal configuration prior to deployment, as illustrated in FIG. 6.

FIGS. 6 and 7 illustrate the pedestrian protection device 6 in its initial configuration, prior to deployment. In this configuration, the lifter plate 10 sits on the base member 9 such that its undersurface rests on the uppermost surface of the base member 9. Also, it will be noted that all of the deformable members 14 occupy initial positions in which they lie substantially flat against the lifter member 10, so as to be accommodated entirely below the level of the raised flanges 22 along each side edge of the base member 9, such that they are all received within the base member 9. This is facilitated by the tapered form of the deformable members 14, which permits them to adopt an initial nested relationship relative to one another in the un-deployed configuration of the device. More particularly, the limbs 16 of all but one of the deformable members 14 are received between the limbs of an adjacent deformable member 14. This nested arrangement of the deformable members in the initial configuration of the device 6 allows the device to have a very low profile, thereby permitting convenient installation of the device in the A-pillar region of a motor vehicle, where available space is often limited. Furthermore, it is to be appreciated that in this initial position, in which the deformable members 14 lie against the lifter member 10, the contact edges 40 of the lifter member 10 do not engage respective notches 41 in the deformable members, but instead rest against respective limbs 16 of the deformable members 14, at positions spaced slightly from the notches 41.

The trim member 7 is arranged to fit over the base member 9, to cover and house the other components of the device, and is configured in the particular embodiment illustrated to present a generally planar external surface 45 which, as noted above, may be configured or styled so as to create the impression of being an integral and visually consistent part of the A-pillar of a motor vehicle when installed on the vehicle in the manner described. It is to be appreciated, however, that the external surface 45 of the trim member 45 need not be planar and could, for example, be curved or arcuate in other embodiments, in order to match or blend with the external configuration of the A-pillar as required. In other respects, the trim member 7 comprises an actuator cover 46 at its forwardmost end, which in preferred embodiments is moulded as an integral part of the trim member 7. As illustrated most clearly in FIG. 6, the actuator cover 46 is hollow so as define a cavity which is shaped and configured to receive the actuator housing 11, the end cap 33, and the end region of the control cable 13. The trim member may also comprise a downwardly depending rim in the form of a skirt 47 which extends around the entire periphery of the trim member, save for a small opening at one end to allow the passage of the control cable 13. When the trim member is arranged over the base member 9 in the initial configuration of the device, the skirt 47 extends around the periphery of the base member 9 so as to conceal and protect the internal components of deployment mechanism beneath the trim member 7. In this configuration the trim member 7 and the base member are substantially parallel to one another, with the trim member 7 being proximal to the base member 9.

Figure 8:
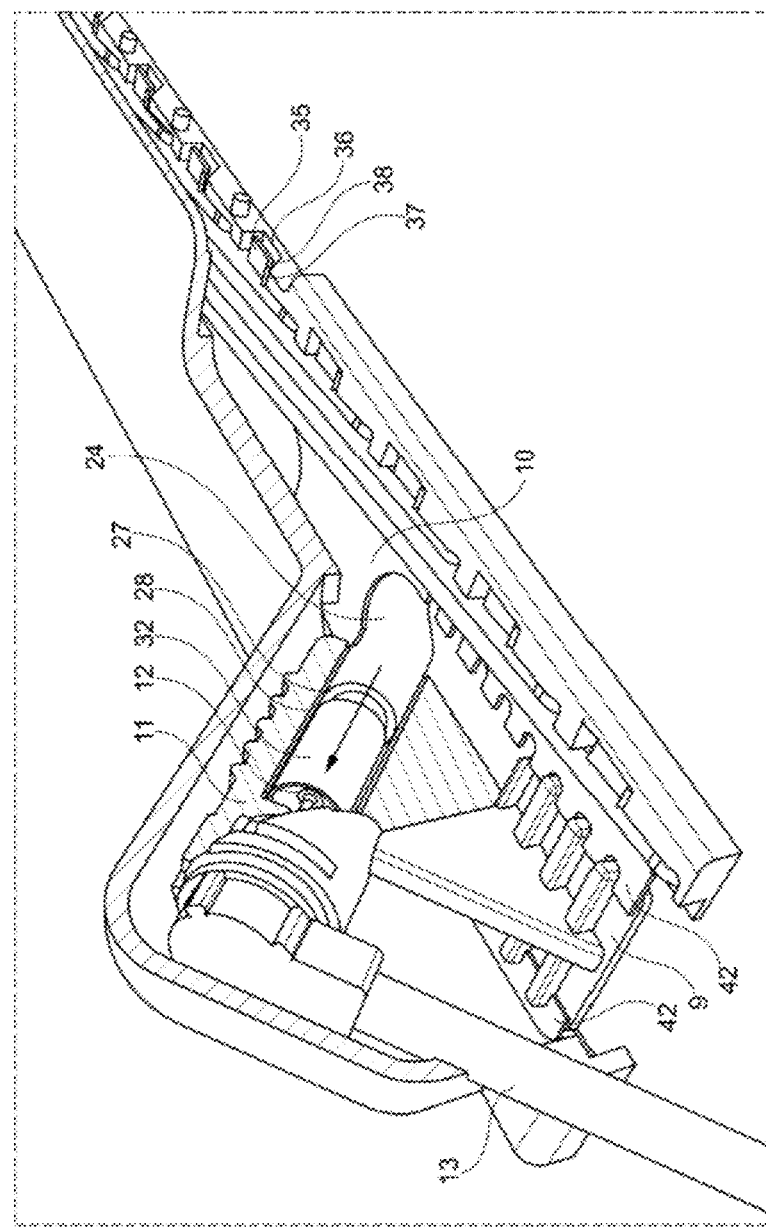
FIG. 8 is a view corresponding generally to that of FIG. 6, but which shows the pedestrian protection device in an initial stage of deployment, shortly after actuation.
Figure 9:
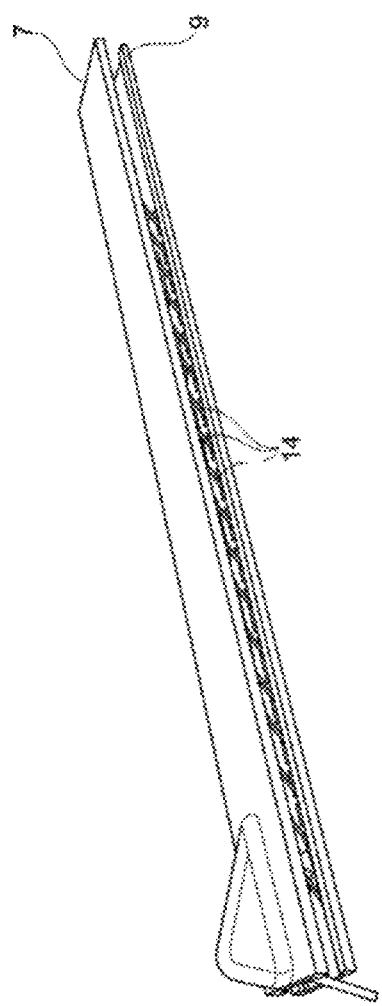
FIG. 9 is a view corresponding generally to that of FIG. 7, but which shows the pedestrian protection device in the initial stage of deployment illustrated in FIG. 8.
Figure 10:
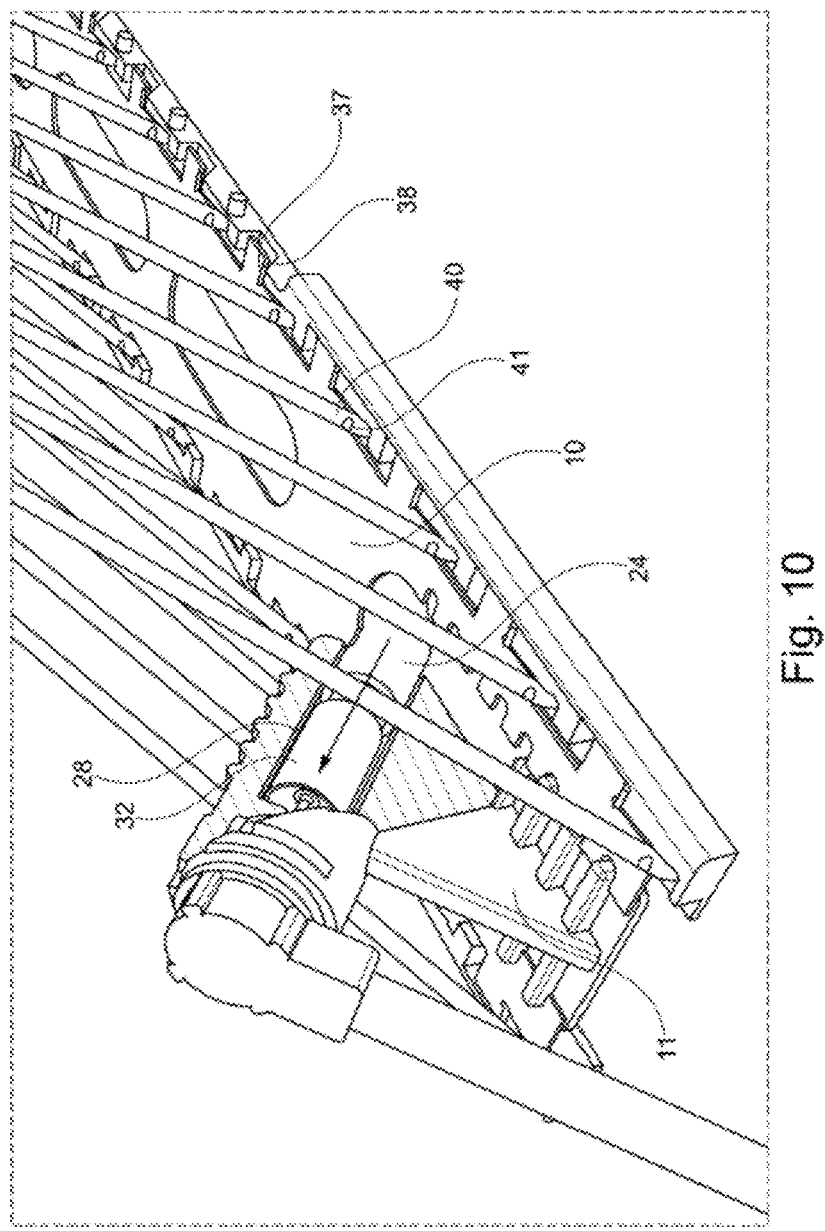
FIG. 10 is a view corresponding generally to that of FIG. 8, but with part of the device omitted for clarity, and which shows the pedestrian protection device in a subsequent early stage of deployment.
Figure 11:
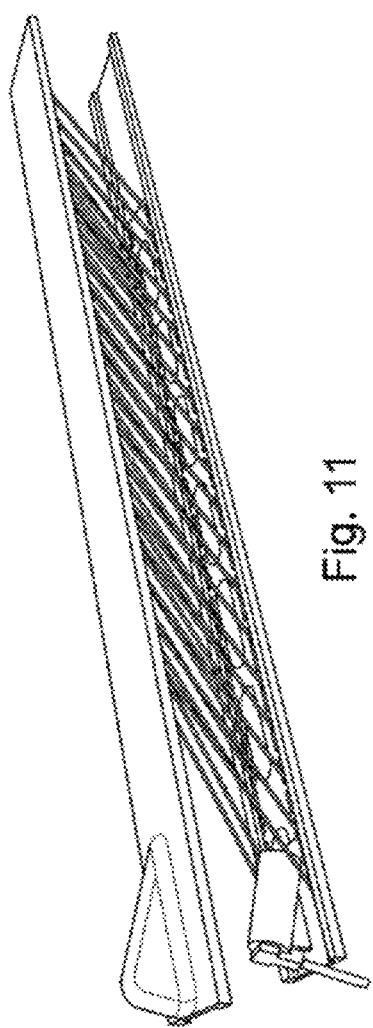
FIG. 11 is a view corresponding generally to that of FIG. 9, but which shows the pedestrian protection device in the subsequent early stage of deployment illustrated in FIG. 10.
Figure 12:
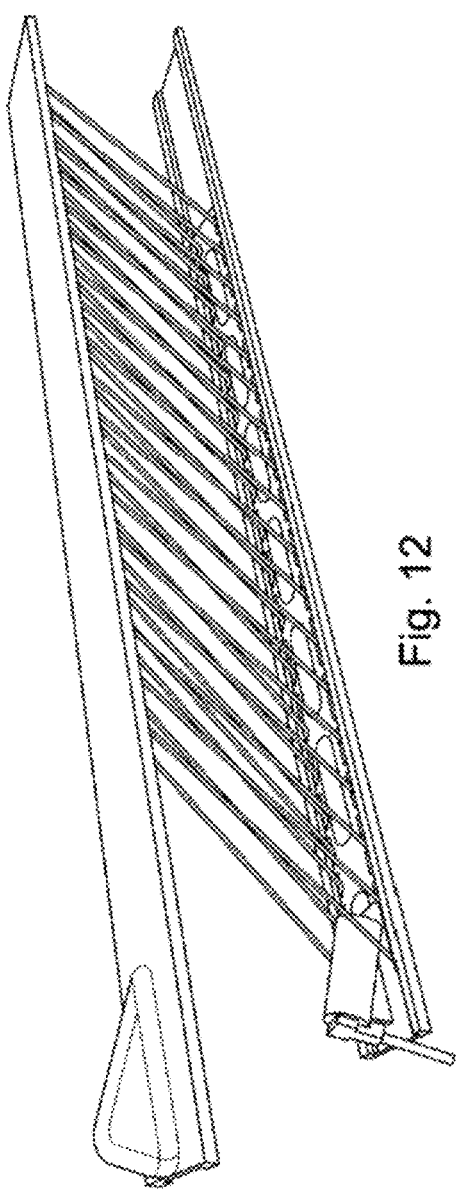
FIG. 12 is a view corresponding generally to that of FIG. 11, but which shows the pedestrian protection device in a subsequent mid stage of deployment.
Figure 13:
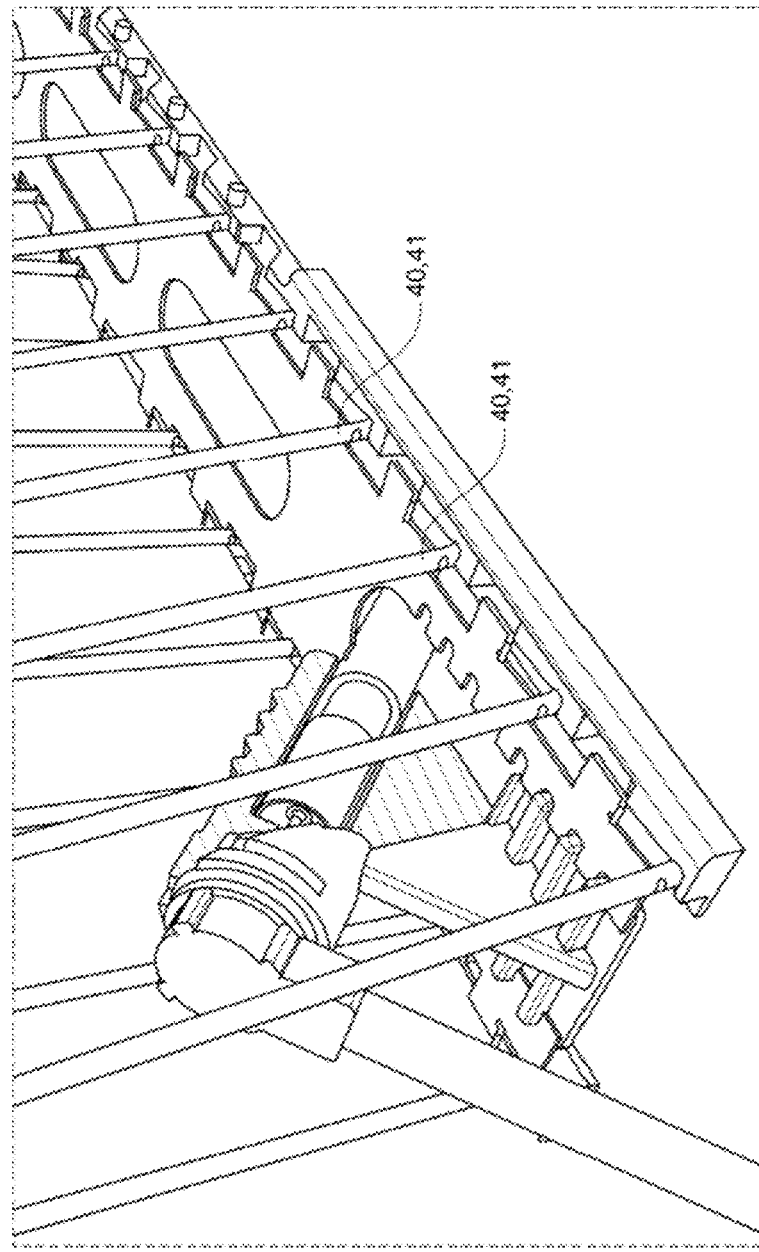
FIG. 13 is a view corresponding generally to that of FIG. 10, but which shows the pedestrian protection device in a subsequent substantially fully deployed stage.
Figure 14:
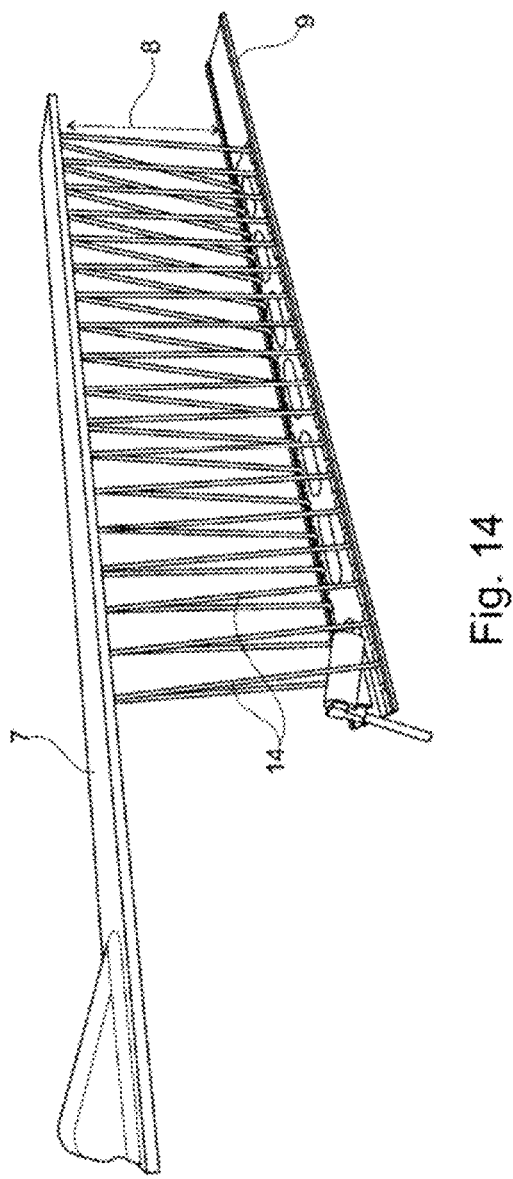
FIG. 14 is a view corresponding generally to that of FIG. 12, but which shows the pedestrian protection device in a subsequent substantially fully deployed stage illustrated in FIG. 13.

The deployment of the pedestrian protection device 6 will now be described with particular reference to FIGS. 6-14, noting that: FIGS. 6 and 7 show the device in an initial configuration prior to deployment; FIGS. 8 and 9 show the device in an initial stage of deployment, shortly after actuation; FIGS. 10 and 11 show the device in a subsequent early stage of deployment; FIG. 12 shows the device in a subsequent mid stage of deployment; and FIGS. 13 and 14 show the device in a subsequent substantially fully deployed stage.

Upon receipt of an actuation signal from the sensor within the vehicle 1, via the control cable 13, the igniter 12 will fire and thereby detonate the pyrotechnic charge 32. The detonating force of the pyrotechnic charge 32 is directed against the adjacent end surface 27 of the spigot 24 inside the firing chamber 28, which thus very rapidly and forcefully urges the actuator housing 11 away from the base member 9 in a linear manner, guided by sliding movement of the firing chamber 28 along the spigot 24, as illustrated in FIG. 8. The foot plate 29 of the actuator housing 11 is thus urged upwardly and forwardly relative to the base member 10, in a direction parallel to the longitudinal axis of the spigot 24.

Due to the above-mentioned engagement between the foot plate 29 of the actuator housing 11 and the end arms 42 of the lifter member 10 (via the projections 30 on the foot plate 29 and the notches 44 and the arms 42), the above-mentioned movement of the actuator housing 11 is imparted also to the lifter member 10, such that the lifter member 10 is correspondingly urged upwardly and forwardly relative to the base member 9 by the foot plate 29. This upward and forward movement of the lifter member 10 is guided by upwards sliding movement of the upturned lips 37 of the guide tabs 35 along the inclined guide surfaces 38 of the base member 9. The guide tabs 35 of the lifter member 10 and the guide recesses 36 of the base member thus interact along substantially the entire length of the lifter member 10 to impart the afore-mentioned upward and forward movement to all parts of the lifter member 10 along its entire length. It is therefore considered preferable for the guide surfaces 38 of the guide recesses 36 to be substantially parallel to the longitudinal axis of the spigot 24.

As the lifter member 10 begins to move in the manner described above, its contact edges 40 serve to urge the limbs 16 of the deformable members 14 upwardly, thereby causing an initial degree of pivotal movement of the deformable members 14 relative to the base member 9, about their cranked ends 18 and in synchronism. As will be appreciated, this upward and pivotal movement of the limbs 16 of the deformable members 14 serves to lift the upper ends of the deformable members 14, and thereby drive the trim member 7 away from the base member 9 as illustrated most clearly in figure FIG. 9.

Turning now to consider FIGS. 10 to 12, continued sliding movement of the firing chamber 28 along the spigot 24 due to the detonating force of the pyrotechnic charge 32 serves to urge the lifter member 10 further upwardly and forwardly away from the base member 9, such that the upturned lips 37 of the guide tabs 35 slide further up the inclined guide surfaces 38. This continued movement of the lifter member 10 serves to pivotally raise the limbs 16 of the deformable members 14 further relative to the base member 9, during which the contact edges 40 slide closer to the notches 41. The upper ends of the deformable members 40 are thus raised further away from the base member 9, thereby continuing to drive the trim member 7 away from the base member 9.

As illustrated most clearly in FIGS. 11 and 12, because the deformable members 14 are all identical to one another (in particular being of identical length) and are pivotally connected to both the base member 9 and the trim member 7 in an equi-spaced manner, a parallel motion linkage is provided between the base member 9 and the trim member 7, such that the base member 9 remains parallel to the trim member 7 throughout its movement.

Movement of the lifter member 10 continues in the manner described above, thereby continuing to raise the deformable members 14 and drive the trim member 7 further away from the base member 9 in parallelism, during which the contact edges 40 continue to slide towards the respective notches 41 formed towards the lower ends of the limbs 16 of the deformable members 14. As shown in FIG. 13, the contact edges 40 will eventually slide into respective notches 41, so to become engaged therein, thereby locking the deformable members 14 in respective fully raised positions in which they extend substantially perpendicular to both the base member 9 and the trim member 7, as shown in FIG. 14. It is to be appreciated, however, that in variants of the described embodiment the fully deployed positions of the deformable members could be a short degree past the position in which they are exactly perpendicular to the base member 9, in a so-called 'over-dead-centre' manner. In this condition, the trim member 7 is located in a fully deployed position in which it is spaced maximally from the base member 9 so as to define a significant gap 8 therebetween, with the deformable members 14 extending across the gap 8.

Figure 15:
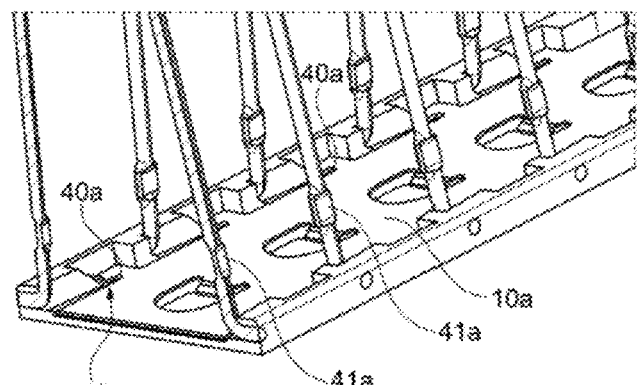
FIG. 15 is a perspective view from above, showing the base region of an alternative embodiment of the pedestrian protection device.
Figure 16:
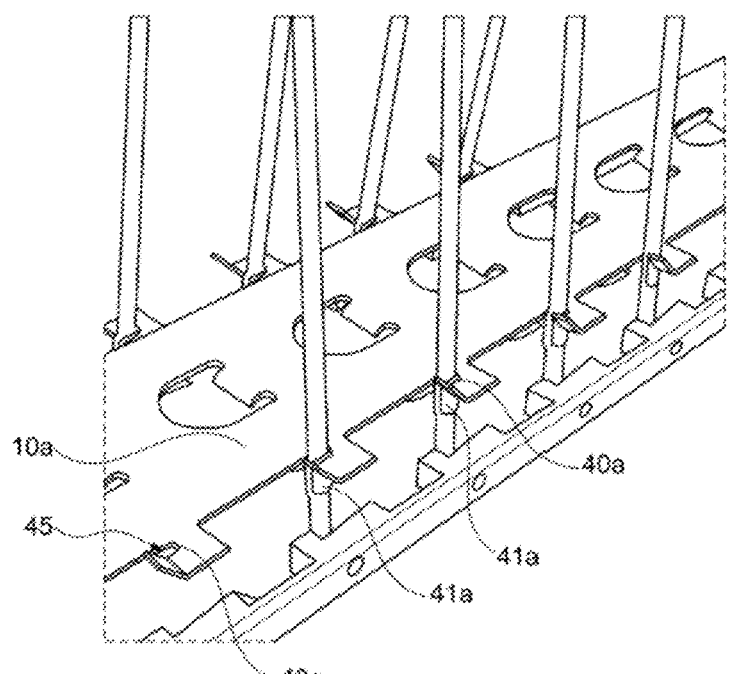
FIG. 16 is a perspective view similar to that of FIG. 15 but which shows a lifter plate of the pedestrian protection device in a raised and substantially fully deployed position.

Turning now to consider FIGS. 15 and 16, aspects of an alternative embodiment are illustrated in which the notches 41 of the above-described deformable members 14 are replaced with flattened portions 41*a* of the wire limbs 16. Also, in this embodiment it will be noted that the contact edges 40*a* are arcuate and define part of respective recesses 45 which are sized and shaped to receive the flattened portions 41*a* of the wire limbs 16 in a close sliding fit when the lifter member 10*a* and the deformable members 14 approach and adopt their respective deployed positions as illustrated in FIG. 16.

Figure 17:
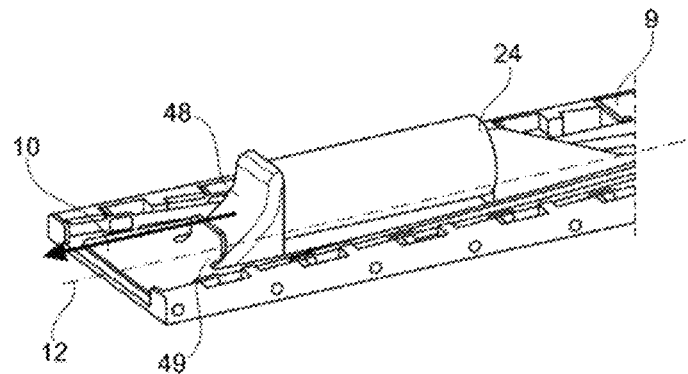
FIG. 17 is a perspective view from above, showing another alternative embodiment of the pedestrian protection device in its normal configuration prior to deployment.
Figure 18:
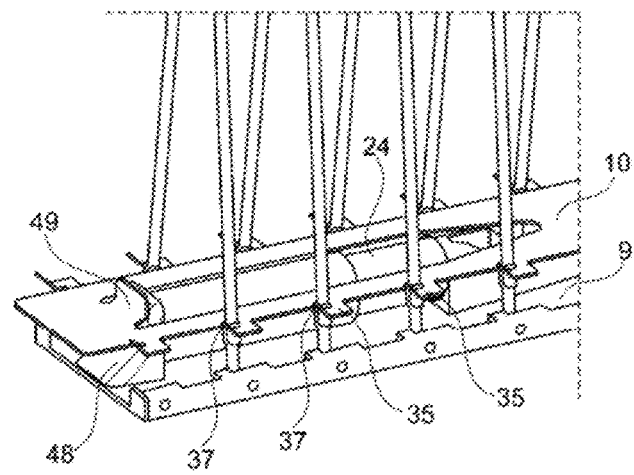
FIG. 18 is a perspective view similar to that of FIG. 17 but which shows a lifter plate of the pedestrian protection device in a raised and substantially fully deployed position.

Turning now to consider FIGS. 17 and 18, aspects of an alternative embodiment are illustrated in which the device's actuator arrangement has a somewhat different configuration to that of the previously described embodiments. Specifically, in this arrangement, the firing spigot 24 of the base member 9 extends generally parallel to the longitudinal axis 25 of the base member 9, rather than at an acute angle as in the case of the embodiment shown in FIGS. 3, 6, 8 and 10. Nevertheless, the firing spigot 24 of this arrangement is again cylindrical in form and is again received as a close sliding fit with the end of a cylindrical firing chamber (not shown) defined inside an actuator housing 11. However, as illustrated in FIGS. 17 and 18, in this embodiment the actuator housing 11 itself is generally cylindrical in form, and thus presents a somewhat lower profile relative to the base member 9 than is the case in the previously described embodiments. This may permit more convenient packaging of the device in some motor vehicles.

Although not shown in FIGS. 17 and 18, a pyrotechnic charge is provided inside the firing chamber, immediately adjacent the end surface of the spigot 24, in a substantially identical manner to that described above with reference to FIG. 6.

The end of the actuator housing 11 which is opposite to the end into which the firing spigot 24 extends is provided with an actuating ramp 48 which is inclined at an acute angle (optionally 45°) to the longitudinal axis 25 of the base member 9. Additionally, in this arrangement, the lifter member 10 is provided with an upturned guide tab 49 which is arranged to bear against the lower region of the actuating ramp 48 in the pre-actuation condition of the device as illustrated in FIG. 17.

Figure 19:
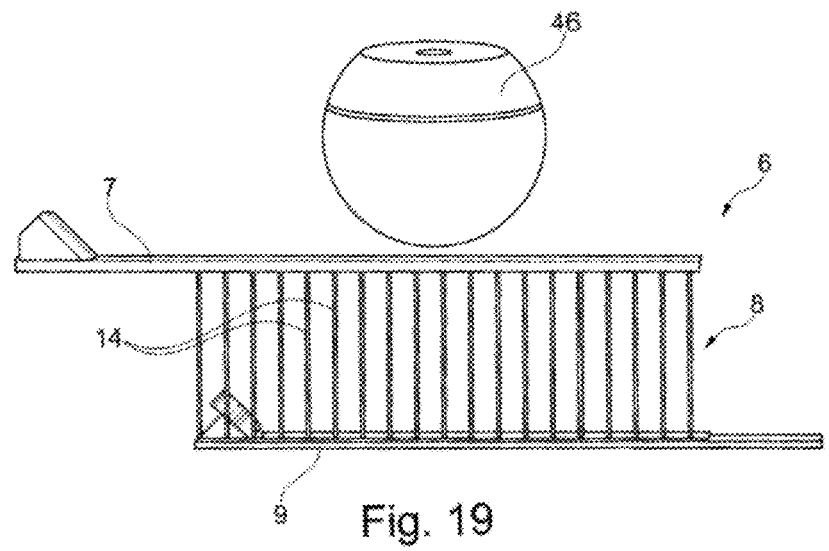
FIG. 19 is a schematic illustration showing a pedestrian protection device in accordance with the present invention in a fully deployed configuration, immediately prior to impact with the head of a pedestrian.

In the arrangement of FIGS. 17 and 18, denotation of a pyrotechnic charge (not shown) provided inside the firing chamber gives rise to a force which is directed against the adjacent end surface of the firing spigot 24, which thus very rapidly and forcefully urges the actuator housing 11 and its actuating ramp 48 away from and along the spigot 24, in a direction generally parallel to the axis of the base member 9, as illustrated by the arrow in FIG. 17. The actuating ramp 48 is thus driven underneath the guide tab 49, such that the guide tab 49 is caused to ride up the surface of the actuating ramp, thereby urging the end of the lifter member 10 upwardly as shown in FIG. 18. As will be appreciated, upward and forward movement of the lifter member 10 arises due to upwards sliding movement of the upturned lips 37 of the guide tabs 35 along the inclined guide surfaces 38 of the base member 9, in the same manner as described above in connection with the preceding embodiments. The guide tabs 35 of the lifter member 10 and the guide recesses 36 of the base member thus interact along substantially the entire length of the lifter member 10 to impart the aforementioned upward and forward movement to all parts of the lifter member 10 along its entire length. FIG. 19 is a schematic illustration showing the pedestrian protection device of the present invention (and specifically the arrangement described above in relation to FIGS. 3 to 14) in its fully deployed position in which the trim member 7 is spaced from the base member 9 by the deformable members 14 so as to define a gap 8 between the trim member 7 and the base member 9, which will be securely mounted to the A-pillar of the motor vehicle when installed in the vehicle. Reference number 46 denotes the head of a pedestrian who has been struck by the vehicle and thrown over the vehicle's hood towards the A-pillar such that the head 46 is about to strike the deployed trim member 7. As will be seen, in the deployed configuration of the device 6, the deformable members 14 are positioned so as to serve as struts acting in compression to support the trim member 7 in its deployed position.

Figure 20:
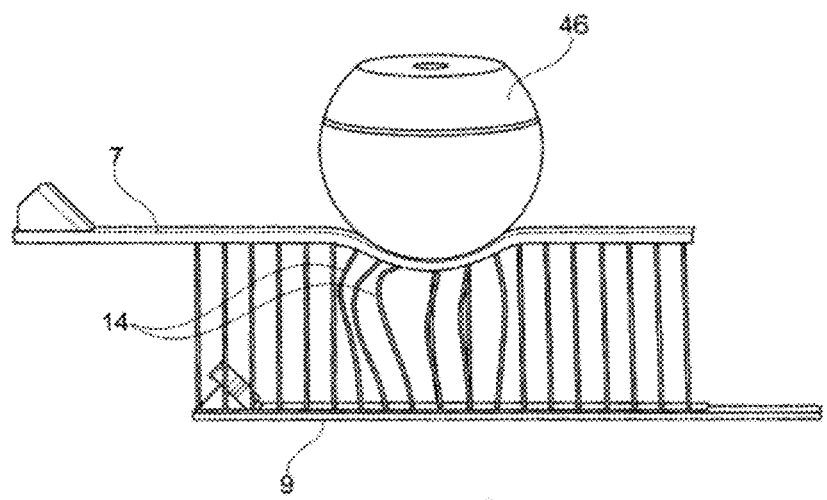
FIG. 20 is a schematic illustration corresponding generally to that of FIG. 19, but which shows the pedestrian protection device after initial impact with the head of a pedestrian.

FIG. 20 illustrates the arrangement at a subsequent stage of the accident, a few milliseconds after FIG. 19, and shows the pedestrian's head 46 having struck the trim member 7. The inertia of the pedestrian's head 46 causes deflection of the plastic trim member 7 as shown, which will serve to absorb a small amount of impact energy and slightly slow the movement of the pedestrian's head 46 towards the supporting A-pillar. As the occupant's head continues to move towards the underlying A-pillar behind the base member, the deformable members 14 begin to buckle and, due to their rigid metal wire construction, thereby absorb significant impact energy via plastic deformation, which in turn serves to more significantly decelerate the occupant's head and slow its movement towards the underlying A-pillar.

Figure 21:
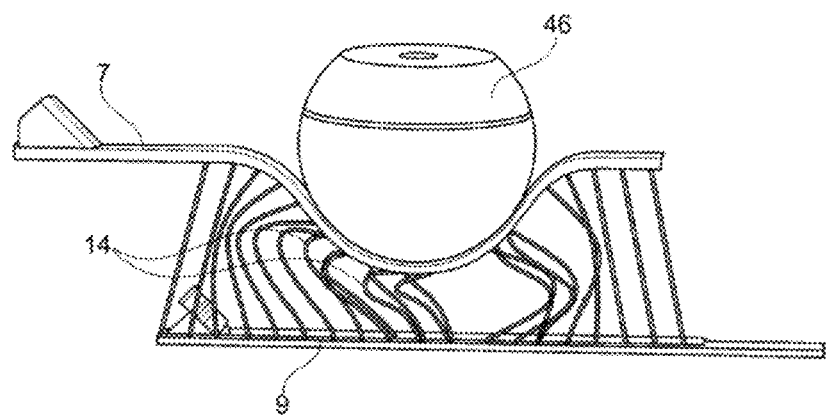
FIG. 21 is a schematic illustration corresponding generally to that of FIG. 20, but which shows the pedestrian protection device in a subsequent stage of an accident, and absorbing impact energy from the head of a pedestrian.
Figure 22:
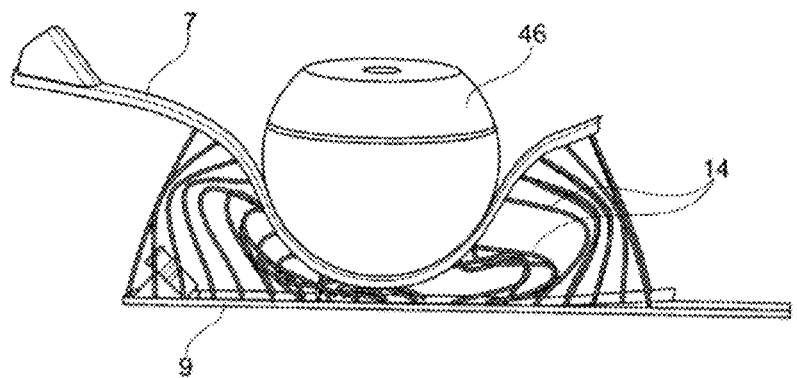
FIG. 22 is a schematic illustration corresponding generally to that of FIG. 21, but which shows the pedestrian protection device in a later stage of an accident, absorbing further impact energy from the head of the pedestrian.

FIGS. 21 and 22 illustrate respective successive stages of impact with the pedestrian's head 46, and show extensive buckling of the deformable members 14. FIG. 22 illustrates the device having absorbed substantially all of the impact energy, with the deformable members 14 very significantly deformed, thereby substantially stopping movement of the pedestrian's head towards the A-pillar. The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the scope of the invention as defined in the claims.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the words "have", "comprise", and "include", and variations such as "having", "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means, for example, +/−10%.

The words "preferred" and "preferably" are used herein to refer to embodiments of the invention that may provide certain benefits under some circumstances. It is to be appreciated, however, that other embodiments may also be preferred under the same or different circumstances. The recitation of one or more preferred embodiments therefore does not mean or imply that other embodiments are not useful, and is not intended to exclude other embodiments from the scope of the disclosure, or from the scope of the claims.

The invention claimed is:

1. A pedestrian protection device for a motor vehicle having a windscreen and an A-pillar extending adjacent a side edge of the windscreen, the pedestrian protection device comprising:
a base member securable to the A-pillar of the motor vehicle;
a trim member moveable relative to said base member; and
a deployment mechanism operable upon actuation of said device to drive said trim member away from said base member from an initial position in which the trim member is proximal to said base member, to a deployed position in which the trim member is spaced from the base member,
wherein said deployment mechanism comprises a plastically deformable member pivotally connected to each of said base member and said trim member, and arranged, in said deployed position of said trim member, to absorb impact energy arising from impact between a pedestrian and said trim member in compression.

2. The pedestrian protection device according to claim 1, wherein said base member and said trim member are both elongate and are arranged so as to be substantially parallel to one another in said initial position, and said deployment mechanism being operable to maintain said parallelism during movement of said trim member from said initial position to said deployed position.

3. The pedestrian protection device according to claim 2, wherein said deployment mechanism comprises a parallel motion linkage arrangement.

4. The pedestrian protection device according to claim 3, wherein said deformable member forms part of said parallel motion linkage arrangement.

5. The pedestrian protection device according to claim 1, wherein said deformable member is substantially elongate and formed of ductile material.

6. The pedestrian protection device according to claim 1, wherein said deformable member is provided in the form of a metal strut.

7. The pedestrian protection device according to claim 1, wherein said deployment mechanism is operable to drive said trim member away from said base member via pivotal movement of said deformable member relative to said base member and said trim member.

8. The pedestrian protection device according to claim 1, wherein said deployment mechanism comprises a plurality of said plastically deformable members.

9. The pedestrian protection device according to claim 8, wherein each of said deformable members comprises a pair of non-parallel limbs terminating in cranked ends which are pivotally connected to said base member.

10. The pedestrian protection device according to claim 9, wherein said plurality of deformable members are arranged in an initial nested relationship relative to one another in an initial un-deployed configuration of the device, such that the limbs of at least one said deformable member are at least partially received between the limbs of an adjacent deformable member.

11. The pedestrian protection device according to claim 10, wherein said plurality of deformable members are received within said base member in said initial nested relationship.

12. The pedestrian protection device according to claim 9, wherein said deployment mechanism further comprises a lifter member engaged with each of said deformable members and moveable to urge said deformable members from respective initial positions to respective deployed positions in synchronism.

13. The pedestrian protection device according to claim 8, wherein said deployment mechanism further comprises a pyrotechnical actuator operable to move a lifter member and thereby urge said deformable members from respective initial positions to respective deployed positions in synchronism.

14. The pedestrian protection device according to claim 1, wherein said deployment mechanism further comprises a pyrotechnical actuator operable to urge said trim member from said initial position towards said deployed position.

15. A motor vehicle comprising a windscreen, an A-pillar extending along a side edge of the windscreen, and a pedestrian protection device according to claim 1, wherein the base member of said pedestrian protection device is secured to said A-pillar, and wherein the trim member of said pedestrian protection device lies against or adjacent the A-pillar to define at least part of an exterior surface of the A-pillar in its initial position.

16. The motor vehicle according to claim 15, wherein said base member and said trim member are both elongate and are arranged to be substantially parallel to one another in said initial position, and said deployment mechanism is operable to maintain said parallelism during movement of said trim member from said initial position to said deployed position.

17. The motor vehicle according to claim 15, wherein said deployment mechanism is operable to drive said trim member away from said base member via pivotal movement of said deformable member relative to said base member and said trim member.

18. The motor vehicle according to claim 15, wherein said deployment mechanism comprises a plurality of said plastically deformable members, each of said deformable members comprises a pair of non-parallel limbs terminating in cranked ends which are pivotally connected to said base member, and wherein said plurality of deformable members are arranged in an initial nested relationship relative to one another in an initial un-deployed configuration of the device, such that the limbs of each deformable member are at least partially received between the limbs of an adjacent deformable member.

19. The motor vehicle according to claim 18, wherein said plurality of deformable members are received within said base member in said initial nested relationship.

* * * * *